United States Patent [19]

Justice

[11] Patent Number: 4,566,220
[45] Date of Patent: Jan. 28, 1986

[54] INSECT TRAP

[75] Inventor: Steve Justice, Parkton, N.C.

[73] Assignee: Clarence Orville Williams, Rocky Mount, N.C.

[21] Appl. No.: 645,415

[22] Filed: Aug. 29, 1984

[51] Int. Cl.⁴ .............................................. A01M 1/04
[52] U.S. Cl. .................................................... 43/113
[58] Field of Search ....................... 43/113, 107, 132.1

[56] References Cited

U.S. PATENT DOCUMENTS

| | | | |
|---|---|---|---|
| 967,883 | 8/1910 | Crabtree | 43/113 |
| 1,019,410 | 3/1912 | Baker | 43/113 |
| 1,820,813 | 8/1931 | Loomis . | |
| 2,384,930 | 9/1945 | Kendrick | 43/113 |
| 2,731,762 | 1/1956 | Jones | 43/113 |
| 3,513,585 | 5/1970 | Ross | 43/113 |
| 3,911,612 | 10/1975 | Sorenson et al. | 43/132 |
| 4,086,721 | 5/1978 | Deas | 43/113 |
| 4,157,629 | 6/1979 | Parks | 43/113 |
| 4,332,100 | 6/1982 | Schneider | 43/113 |
| 4,366,643 | 1/1983 | Boaz | 43/113 |

*Primary Examiner*—Nicholas P. Godici
*Assistant Examiner*—M. Jordan
*Attorney, Agent, or Firm*—B. B. Olive

[57] ABSTRACT

An insect trap particularly adapted for the entrapment and extermination of fleas comprises a flat, shallow pan adapted for resting on the floor, sticky liquid within the pan, a cover positioned over the pan, and an electrically energized green light source suspended within the cover over the pan. The fleas are lured into the sticky liquid by the light source and are exterminated therein.

6 Claims, 2 Drawing Figures

INSECT TRAP

DESCRIPTION

1. Technical Field

The present invention relates to insect traps and particularly to a trap for fleas which lures and exterminates fleas.

2. Background Art

The field of prior art is voluminous with insect traps which employ various lures and traps and which exterminate various types of insects. It is known in the art of insect traps to utilize lights for attracting insects and sticky substances for trapping the insects. A white electric light suspended over a pan of water has been used but has not proven effective for trapping large numbers of fleas. Thus, the search for a more perfect combination of light, sticky substance and container for catching fleas has controlled. A widely-used flea trap has not yet been developed.

3. Disclosure of Invention

In accordance with the present invention, applicant provides an insect trap designed specifically for entrapment and extermination of fleas comprising a shallow pan, a sticky liquid or other sticky substance within the shallow pan, a cover positioned over the pan and an electrically energized green light source suspended from the bottom of the cover. Fleas attracted to the green light source jump over the side wall of the shallow pan into the sticky substance which in turn prevents escape and eventual extermination of the fleas.

BEST MODE FOR CARRYNG OUT THE INVENTION

Figure 1:
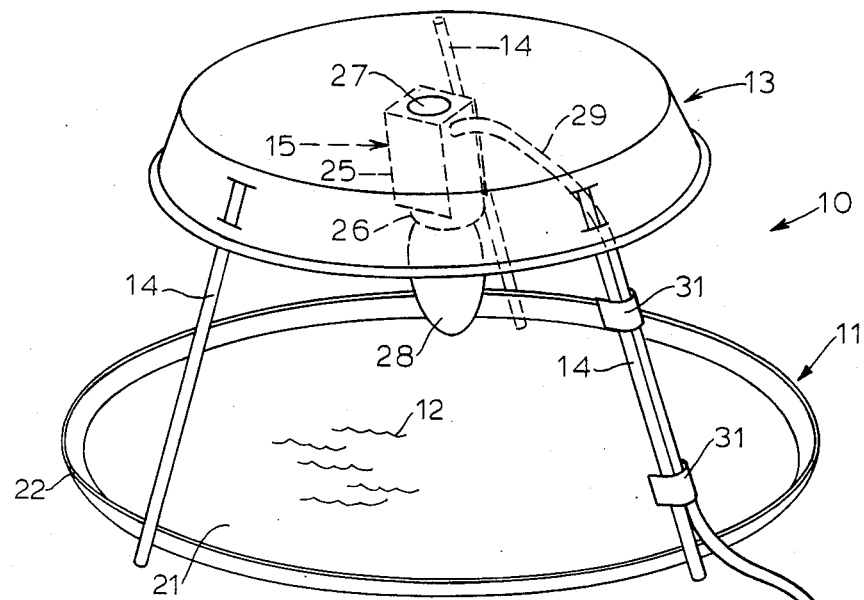
FIG. 1 is a pictorial view of a first embodiment of the invention insect trap.

Referring to the drawings, an insect trap 10 constructed in accordance with the present invention and in particular the preferred embodiment of FIG. 1 comprises a shallow, round pan 11, a sticky liquid 12 within pan 11 and a smaller, round cover 13 supported in a vertically-spaced relation a few inches above pan 11 by legs 14 which straddle pan 14 but are unsecured thereto. An electrically-energized green light source 15 is secured to and is suspended from the light reflective surfaced underside of cover 13. Thus, the flea is attracted by downwardly directed reflected green light mixed with downwardly and outwardly directed radiated green light from the source 15. A three to five inch space between the light 15 and the liquid 12 has been effective though the amount of such spacing does not appear to be critical. Pan 11 has a flat bottom wall 21 and an upstanding side wall 22 which is sufficiently low in height to allow fleas to jump thereover. Bracket 25 holds light socket 26 in place suspended from the underside of cover 13. Pan 11 and cover 13 may be formed of large and medium size pie pans. Bracket 25 is integrally secured to cover 13 by means of rivet or screw 27. Light bulb 28 is conventionally mounted in socket 26 and in the preferred form bulb 28 is green. Essentially any shade or degree of luminosity, i.e. bright or dull, of green appears to be effective. Cord 29 extends from socket 26 and through plug 30 connects to a conventional electrical wall outlet as a source of electricity. Cord 29 is removably secured to one of the three legs 14 by means of clips 31.

Figure 2:
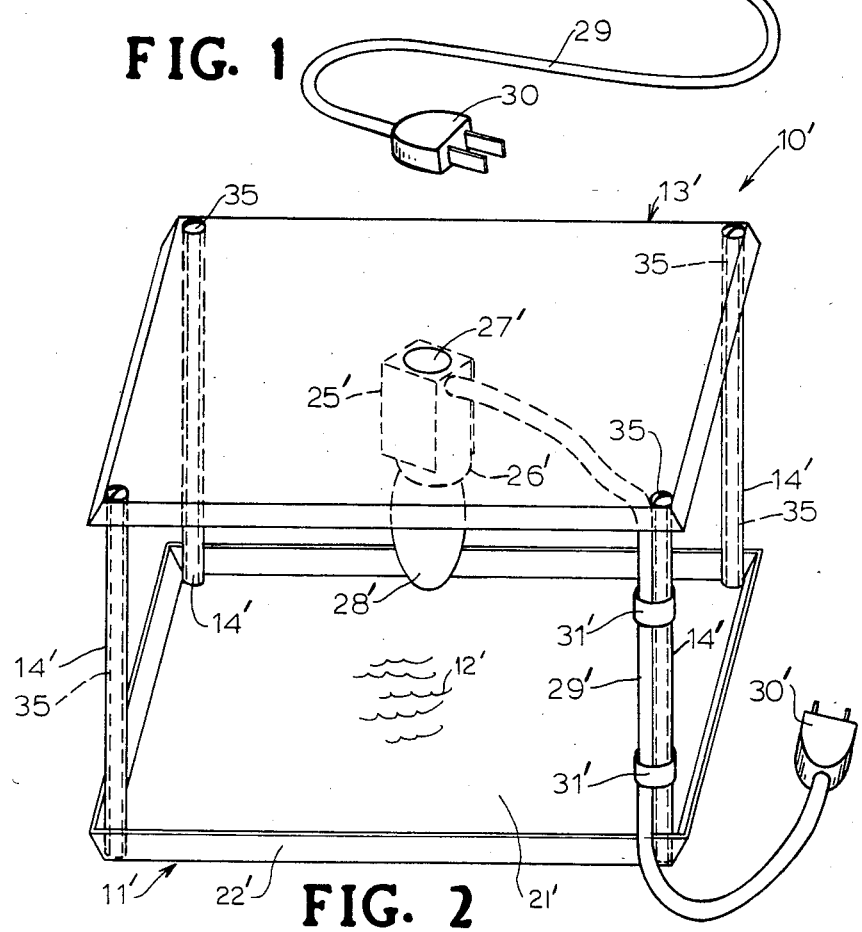
FIG. 2 is a pictorial view of a second embodiment of the insect trap.

FIG. 2 illustrates a second or alternative embodiment of the invention device. Insect trap 10' utilizes a shallow, rectangular pan 11' with a flat bottom wall 21' and an upstanding low side wall 22 over which fleas can jump and a rectangular cover 13' of approximately the same size supported in a vertically spaced relation over pan 11' by legs 14'. Legs 14' are fixedly secured to pan 11' and cover 13' by means of elongated bolts 35 which pass through legs 14' and connect legs 14' with pan 11' and cover 13'. As in the first embodiment, a bracket 25' holds light socket 26' in place suspended from the light reflective surfaced underside of cover 13'. Bracket 25' is integrally secured to cover 13' by means of rivet or screw 27'. Green light bulb 28' is conventionally mounted in socket 26' and cord 29' connects through plug 30' to an electrical wall outlet as in the first embodiment. As in the first embodiment, a sticky liquid 12' is maintained at a predetermined level within pan 11'. Clips 31' connects cord 29' to one of the legs 14'. In both embodiments as previously mentioned, the underside of the cover is preferably either made from or is covered with a reflective material to provide a light reflective surface to intensify the glow of the green light source.

In operation, the basic principal is to lure fleas into the bottom pan by means of a light source and it has been discovered that a green light source works most favorably. A conventional low wattage, green-colored incandescent bulb of the household night light size meets the desired requirements of the invention. Also, the presence of a cover supported a few inches over the pan has also been discovered to enhance the efficiency of the trap as has use of a pan with a low sidewall for holding the sticky liquid. The green light lures the fleas to the pan which necessitates the fleas jumping over the low sidewall of the pan which they are able to do and through the open space provided between the pan and cover. As previously mentioned, the pan has a predetermined level of sticky liquid therein. The liquid is preferably of an oily formula which is non-toxic and can be safely used in a home where there are small children and pets. Liquids such as corn oil, peanut oil, Wesson oil, Crisco oil, baby oil and mineral oil are all effective sticky liquids for application to the invention and are non-offensive to the fleas. The fleas are attracted to the green light, jump into the liquid in the bottom pan and are thus trapped in the sticky liquid until they die.

The invention insect trap advantageously lures the fleas from carpet and furniture wherein conventional methods of spraying for fleas tends to drive the fleas to other areas. Also, while spraying kills adult fleas, it dissipates and is virtually non-effective for killing of yound fleas to come from eggs left in the area. The invention insect trap attracts daily any fleas in the area and over a period of time has been found to effectively eliminate virtually all flea within that area. While primarily intended to lure and trap fleas it is recognized that other insects may also be trapped and exterminated by the invention device.

What is claimed is:

1. A trap for catching wingless non-flying fleas, comprising:
    (a) a shallow pan having and supported by a flat bottom wall enabling said pan to be accessible to a source of fleas to be trapped;

(b) a sticky substance disposed in said pan and providing a sticky landing surface above said bottom wall for live fleas to be trapped and killed;

(c) a cover supported in vertically spaced relation over said pan, having a light reflective surface opposing the said bottom wall of said pan and located to provide open unobstructed space between said cover and pan to permit said fleas to jump through said space into said pan to contact said sticky landing surface; and (d) an electrically energized visible green light source, said green light source being secured to said cover below said light reflective surface thereby generating and exposing to the fleas sought to be trapped both reflected downwardly transmitted green light mixed with downwardly and outwardly transmitted directly radiated green light from said source.

2. A trap as claimed in claim 1 wherein said cover is supported over said pan by means joining said cover and pan.

3. A trap as claimed in claim 1 wherein said cover is supported over said pan by a plurality of leg members secured thereto adapted to rest around and unsecured to said pan.

4. A trap as claimed in claim 1 wherein said substance is a liquid substance for trapping said fleas.

5. A trap as claimed in claim 1 wherein said light source is located five inches or less above said substance.

6. A trap for catching non-flying wingless fleas, comprising:

(a) trapping means providing an accessible sticky surface for live fleas to be trapped;

(b) a light reflecting cover supported over, opposing and vertically spaced above said trapping means so as to provide open unobstructed space around said trapping means to permit fleas to jump toward said trapping means; and (c) an electrically energized visible incandescent green light source supported over said trapping means beneath said light reflecting cover for generating both downwardly directed reflected green light and directly radiated green light from said source for attracting said fleas to jump toward and to said sticky surface to be trapped.

* * * * *

UNITED STATES PATENT AND TRADEMARK OFFICE
CERTIFICATE OF CORRECTION

PATENT NO. : 4,566,220
DATED : Jan. 28, 1986
INVENTOR(S) : Steve Justice

It is certified that error appears in the above—identified patent and that said Letters Patent is hereby corrected as shown below:

Column 1, line 19, "controlled" should read --continued--.

Column 2, line 56, "yound" should read --young--.

Signed and Sealed this

Twenty-second Day of April 1986

[SEAL]

Attest:

DONALD J. QUIGG

Attesting Officer  Commissioner of Patents and Trademarks

UNITED STATES PATENT OFFICE
CERTIFICATE OF CORRECTION

Patent No. 4,566,220           Dated January 28, 1986

Inventor(s) Steve Justice

It is certified that error appears in the above-identified patent and that said Letters Patent are hereby corrected as shown below:

Column 2, line 6, the number "22" should read -- 22' --.
    (PTO error)

Signed and Sealed this

Twenty-fourth Day of June 1986

[SEAL]

Attest:

DONALD J. QUIGG

Attesting Officer    Commissioner of Patents and Trademarks